US008394972B2

(12) United States Patent
Wassmer et al.

(10) Patent No.: US 8,394,972 B2
(45) Date of Patent: Mar. 12, 2013

(54) PROCESS FOR CONTROLLED HYDROLYSIS AND CONDENSATION OF EPOXY-FUNCTIONAL ORGANOSILANES AND THE COCONDENSATION THEREOF WITH FURTHER ORGANOFUNCTIONAL ALKOXYSILANES

(75) Inventors: Christian Wassmer, Hausen (DE); Burkhard Standke, Lörrach (DE); Irene Lippert, Rheinfelden (DE); Peter Jenkner, Wesel (DE)

(73) Assignee: Evonik Degussa GmbH, Essen (DE)

( * ) Notice: Subject to any disclaimer, the term of this patent is extended or adjusted under 35 U.S.C. 154(b) by 297 days.

(21) Appl. No.: 12/673,390

(22) PCT Filed: Jun. 17, 2008

(86) PCT No.: PCT/EP2008/057590
§ 371 (c)(1),
(2), (4) Date: Feb. 16, 2010

(87) PCT Pub. No.: WO2009/021766
PCT Pub. Date: Feb. 19, 2009

(65) Prior Publication Data
US 2010/0191001 A1    Jul. 29, 2010

(51) Int. Cl.
*C07F 7/02*    (2006.01)
(52) U.S. Cl. .................................................. 549/215
(58) Field of Classification Search ............ 549/215
See application file for complete search history.

(56) References Cited

U.S. PATENT DOCUMENTS

| 4,226,793 A | 10/1980 | Kotzsch et al. |
| 5,306,856 A | 4/1994 | Streck et al. |
| 5,591,818 A | 1/1997 | Standke et al. |

(Continued)

OTHER PUBLICATIONS

Grant et al, Grant & Hackh's Chemical Dictionary, McGraw-Hill Book Com, 1987, p. 11-12.*

(Continued)

*Primary Examiner* — Taylor Victor Oh
(74) *Attorney, Agent, or Firm* — Oblon, Spivak, McClelland, Maier & Neustadt, L.L.P.

(57) ABSTRACT

The present invention relates to a process for performing a controlled hydrolysis and condensation of an epoxy-functional silane of the general formula I R1-SiR'm(OR)3-$m$ (I) in which R1 is a (III) or (IV) group and R, R' and R" groups are the same or different and are each hydrogen (H) or a linear, branched or cyclic, optionally substituted alkyl group having from 1 to 6 carbon atoms, A and A' groups are the same or different and are each a bivalent alkyl group having from 1 to 10 carbon atoms, R2 groups are the same or different and R2 is a linear, branched or cyclic, optionally substituted alkyl group having from 1 to 20 carbon atoms, and m is 0 or 1, and optionally of at least one further organofunctional silane of the general formula II R2-SiR'n(OR)3-$n$ (II) in which R2 is an organofunctional group as already defined above, R' is methyl, R groups are each independently hydrogen or a linear, branched or cyclic alkyl group having from 1 to 6 carbon atoms and n is 0 or 1, where from 0.001 to ≦5 mol of water is used per mole of alkoxy function of the silanes used, no further hydrolysis or condensation catalyst is used apart from boric acid as the hydrolysis catalyst and condensation component, and the condensates formed in the reaction are based on Si—O—B— and/or Si—O—Si bonds.

13 Claims, 22 Drawing Sheets

Figure for comparative experiment 1

U.S. PATENT DOCUMENTS

| | | | |
|---|---|---|---|
| 5,629,400 A | 5/1997 | Standke et al. |
| 5,679,147 A | 10/1997 | Standke et al. |
| 5,744,675 A | 4/1998 | Fiolitakis et al. |
| 5,808,125 A | 9/1998 | Standke et al. |
| 5,849,942 A | 12/1998 | Standke et al. |
| 5,863,509 A | 1/1999 | Standke et al. |
| 5,885,341 A | 3/1999 | Standke et al. |
| 5,932,757 A | 8/1999 | Standke et al. |
| 6,020,448 A | 2/2000 | Jenkner et al. |
| 6,054,601 A | 4/2000 | Standke et al. |
| 6,069,259 A | 5/2000 | Crivello |
| 6,118,015 A | 9/2000 | Haas et al. |
| 6,133,466 A | 10/2000 | Edelmann et al. |
| 6,139,622 A | 10/2000 | Gobel et al. |
| 6,176,918 B1 | 1/2001 | Glausch et al. |
| 6,177,582 B1 | 1/2001 | Jenkner et al. |
| 6,228,936 B1 | 5/2001 | Standke et al. |
| 6,239,194 B1 | 5/2001 | Standke et al. |
| 6,251,989 B1 | 6/2001 | Edelmann et al. |
| 6,255,513 B1 | 7/2001 | Standke et al. |
| 6,288,256 B1 | 9/2001 | Standke et al. |
| 6,361,871 B1 | 3/2002 | Jenkner et al. |
| 6,391,999 B1 | 5/2002 | Crivello |
| 6,395,858 B1 | 5/2002 | Mack et al. |
| 6,403,228 B1 | 6/2002 | Mack et al. |
| 6,491,838 B1 | 12/2002 | Standke et al. |
| 6,500,883 B1 | 12/2002 | Mack et al. |
| 6,528,585 B1 | 3/2003 | Standke et al. |
| 6,534,667 B1 | 3/2003 | Standke et al. |
| 6,641,870 B2 | 11/2003 | Bartkowiak et al. |
| 6,663,683 B2 | 12/2003 | Lortz et al. |
| 6,676,719 B2 | 1/2004 | Lortz et al. |
| 6,685,766 B2 | 2/2004 | Standke et al. |
| 6,689,468 B2 | 2/2004 | Edelmann et al. |
| 6,695,904 B2 | 2/2004 | Burger et al. |
| 6,699,586 B2 | 3/2004 | Edelmann et al. |
| 6,713,186 B1 | 3/2004 | Jenkner et al. |
| 6,767,377 B2 | 7/2004 | Schumacher et al. |
| 6,767,982 B2 | 7/2004 | Standke et al. |
| 6,770,327 B2 | 8/2004 | Edelmann et al. |
| 6,773,697 B2 | 8/2004 | Hemme et al. |
| 6,773,814 B2 | 8/2004 | Schumacher et al. |
| 6,808,769 B2 | 10/2004 | Batz-Sohn et al. |
| 6,830,816 B2 | 12/2004 | Mehnert et al. |
| 6,841,197 B2 | 1/2005 | Standke et al. |
| 6,864,323 B2 | 3/2005 | Schlosser et al. |
| 6,905,632 B2 | 6/2005 | Lortz et al. |
| 6,946,537 B2 | 9/2005 | Krafczyk et al. |
| 6,991,190 B2 | 1/2006 | Lortz et al. |
| 7,015,270 B2 | 3/2006 | Scharfe et al. |
| 7,026,398 B2 | 4/2006 | Monkiewicz et al. |
| 7,083,769 B2 | 8/2006 | Moerters et al. |
| 7,244,302 B2 | 7/2007 | Schumacher et al. |
| 7,255,735 B2 | 8/2007 | Meyer et al. |
| 7,374,787 B2 | 5/2008 | Lortz et al. |
| 7,399,487 B2 | 7/2008 | Batz-Sohn et al. |
| 7,423,165 B2 | 9/2008 | Korth et al. |
| 7,427,442 B2 | 9/2008 | Albert et al. |
| 7,470,423 B2 | 12/2008 | Lortz et al. |
| 7,538,142 B2 | 5/2009 | Lortz et al. |
| 7,572,854 B2 | 8/2009 | Schneider et al. |
| 7,578,877 B2 | 8/2009 | Giessler et al. |
| 7,611,753 B2 | 11/2009 | Bartkowiak et al. |
| 7,615,577 B2 | 11/2009 | Lortz et al. |
| 7,625,975 B2 | 12/2009 | Barfurth et al. |
| 7,645,335 B2 | 1/2010 | Lortz et al. |
| 7,666,257 B2 | 2/2010 | Giessler-Blank et al. |
| 7,670,422 B2 | 3/2010 | Giessler-Blank et al. |
| 7,749,322 B2 | 7/2010 | Schumacher et al. |
| 7,780,777 B2 | 8/2010 | Perlet et al. |
| 7,815,936 B2 | 10/2010 | Hasenzahl et al. |
| 7,834,073 B2 | 11/2010 | Standke et al. |
| 7,976,719 B2 | 7/2011 | Batz-Sohn et al. |
| 8,012,367 B2 | 9/2011 | Hasenzahl et al. |
| 2002/0098243 A1 | 7/2002 | Edelmann et al. |
| 2002/0127415 A1 | 9/2002 | Standke et al. |
| 2002/0197311 A1 | 12/2002 | Hasenzahl et al. |
| 2003/0018155 A1 | 1/2003 | Krafczyk et al. |
| 2003/0108580 A1 | 6/2003 | Hasenzahl et al. |
| 2003/0134969 A1 | 7/2003 | Schlosser et al. |
| 2003/0228271 A1 | 12/2003 | Batz-Sohn et al. |
| 2004/0240062 A1 | 12/2004 | Lortz et al. |
| 2005/0169861 A1 | 8/2005 | Lortz et al. |
| 2005/0265934 A1 | 12/2005 | Schumacher et al. |
| 2006/0063002 A1 | 3/2006 | Edelmann et al. |
| 2006/0104881 A1 | 5/2006 | Lortz et al. |
| 2006/0159635 A1 | 7/2006 | Meyer et al. |
| 2006/0159636 A1 | 7/2006 | Meyer et al. |
| 2006/0159637 A1 | 7/2006 | Meyer et al. |
| 2006/0163533 A1 | 7/2006 | Batz-Sohn et al. |
| 2006/0225613 A1 | 10/2006 | Lejeune et al. |
| 2006/0229210 A1 | 10/2006 | Neugebauer et al. |
| 2006/0292192 A1 | 12/2006 | Hasenzahl et al. |
| 2007/0054056 A1 | 3/2007 | Albert et al. |
| 2007/0099004 A1 | 5/2007 | Edelmann et al. |
| 2007/0110906 A1 | 5/2007 | Edelmann et al. |
| 2007/0231280 A1 | 10/2007 | Schumacher et al. |
| 2007/0297998 A1 | 12/2007 | Meyer et al. |
| 2008/0003448 A1 | 1/2008 | Standke et al. |
| 2008/0027161 A1 | 1/2008 | Schlosser et al. |
| 2008/0058489 A1 | 3/2008 | Edelmann et al. |
| 2008/0095724 A1 | 4/2008 | Hasenzahl et al. |
| 2008/0187673 A1 | 8/2008 | Standke et al. |
| 2008/0188617 A1 | 8/2008 | Standke et al. |
| 2008/0200577 A1 | 8/2008 | Spyrou et al. |
| 2008/0206572 A1 | 8/2008 | Edelmann et al. |
| 2008/0213325 A1 | 9/2008 | Schumacher et al. |
| 2008/0221318 A1 | 9/2008 | Edelmann et al. |
| 2008/0233341 A1 | 9/2008 | Jenkner et al. |
| 2008/0249237 A1 | 10/2008 | Hager et al. |
| 2008/0264299 A1 | 10/2008 | Lortz et al. |
| 2009/0005518 A1 | 1/2009 | Just et al. |
| 2009/0007818 A1 | 1/2009 | Militz et al. |
| 2009/0022898 A1 | 1/2009 | Standke et al. |
| 2009/0030162 A1 | 1/2009 | Mueh et al. |
| 2009/0047225 A1 | 2/2009 | Hasenzahl et al. |
| 2009/0069464 A1 | 3/2009 | Standke |
| 2009/0131694 A1 | 5/2009 | Schumacher et al. |
| 2009/0186053 A1 | 7/2009 | Meyer et al. |
| 2009/0261309 A1 | 10/2009 | Lortz et al. |
| 2010/0056662 A1 | 3/2010 | Spyrou et al. |
| 2010/0117021 A1 | 5/2010 | Batz-Sohn et al. |
| 2010/0209339 A1 | 8/2010 | Schumacher et al. |
| 2010/0209719 A1 | 8/2010 | Borup et al. |
| 2010/0233392 A1 | 9/2010 | Batz-Sohn et al. |
| 2010/0308287 A1 | 12/2010 | Lortz et al. |
| 2011/0034584 A1 | 2/2011 | Albert et al. |
| 2011/0045723 A1 | 2/2011 | Nowak et al. |
| 2011/0071256 A1 | 3/2011 | Nowak et al. |
| 2011/0259240 A1 | 10/2011 | Jenkner et al. |
| 2012/0031302 A1 | 2/2012 | Albert et al. |

OTHER PUBLICATIONS

U.S. Appl. No. 12/933,028, filed Sep. 16, 2010, Spyrou.
U.S. Appl. No. 13/389,561, filed Feb. 8, 2012, Albert, et al.
U.S. Appl. No. 13/580,194, filed Aug. 21, 2012, Borup, et al.

\* cited by examiner

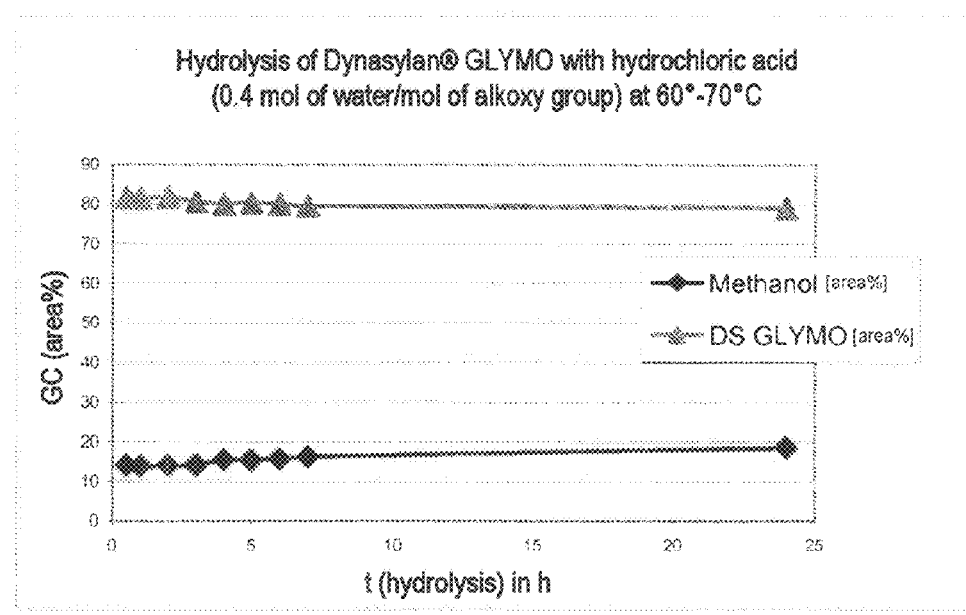
Figure 1: Figure for comparative experiment 1

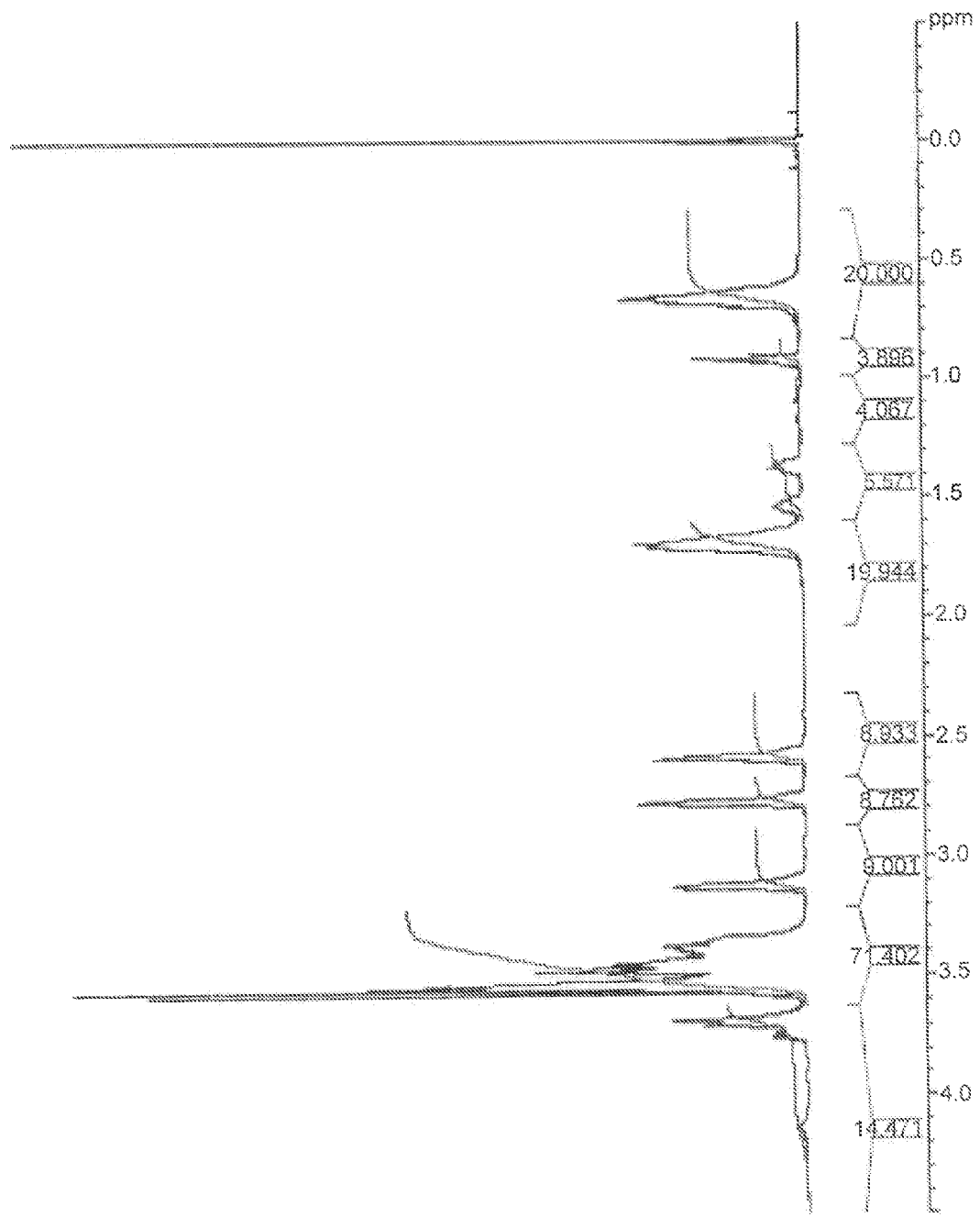
Fig. 2A: 1H NMR spectrum for Comparative Example 2

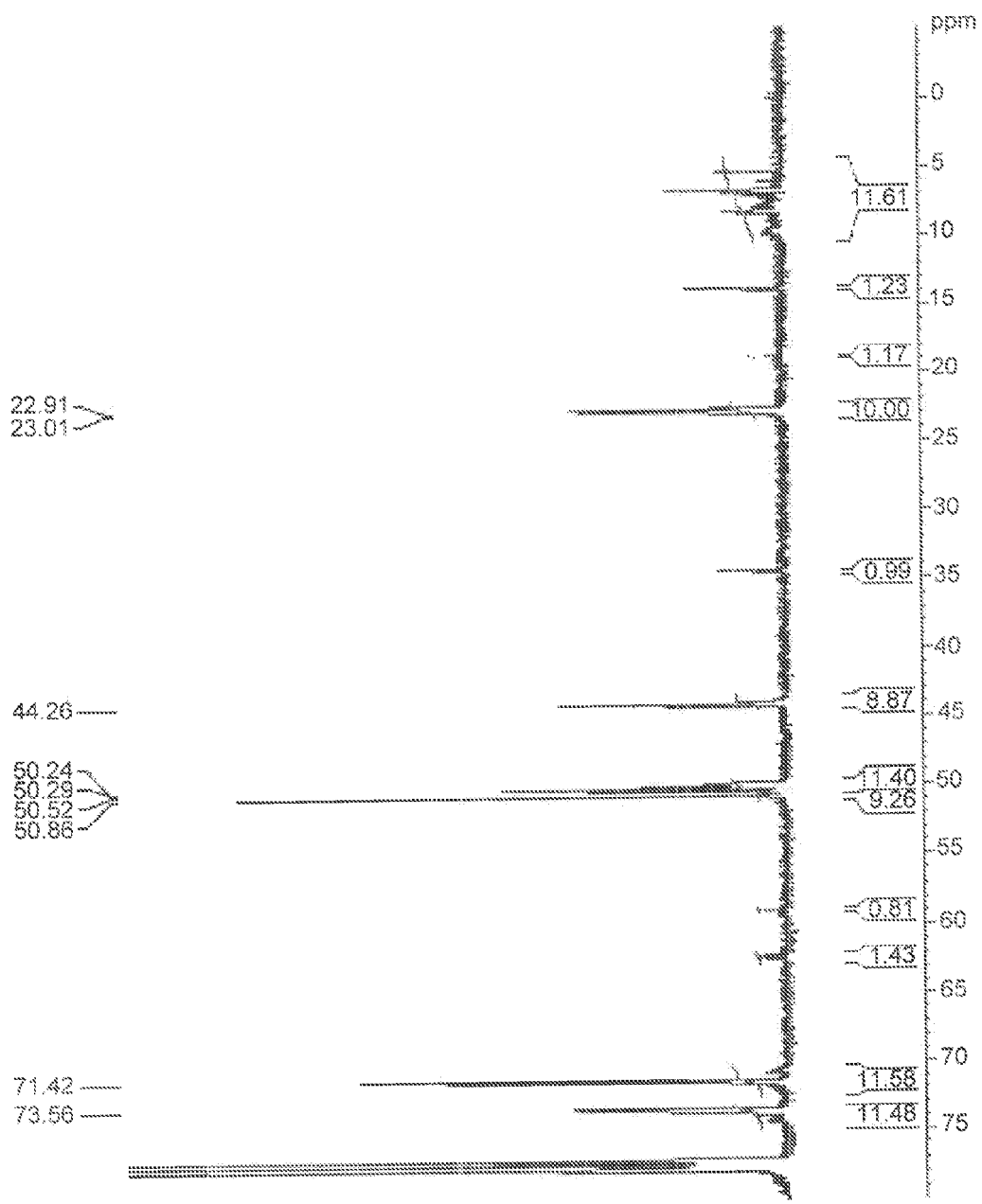
Fig. 2B: 13C NMR spectrum for Comparative Example 2

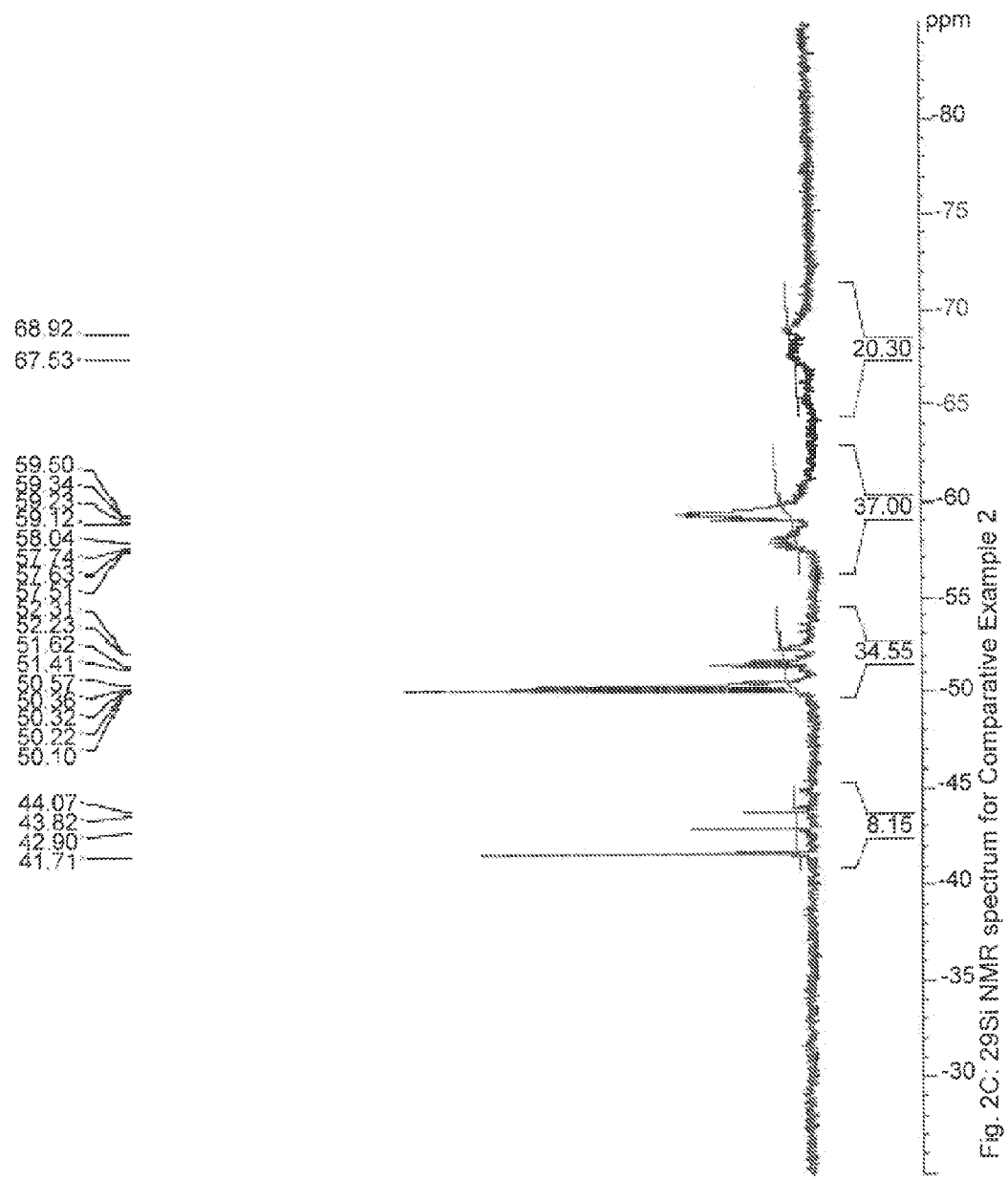
Fig. 2C: 29Si NMR spectrum for Comparative Example 2

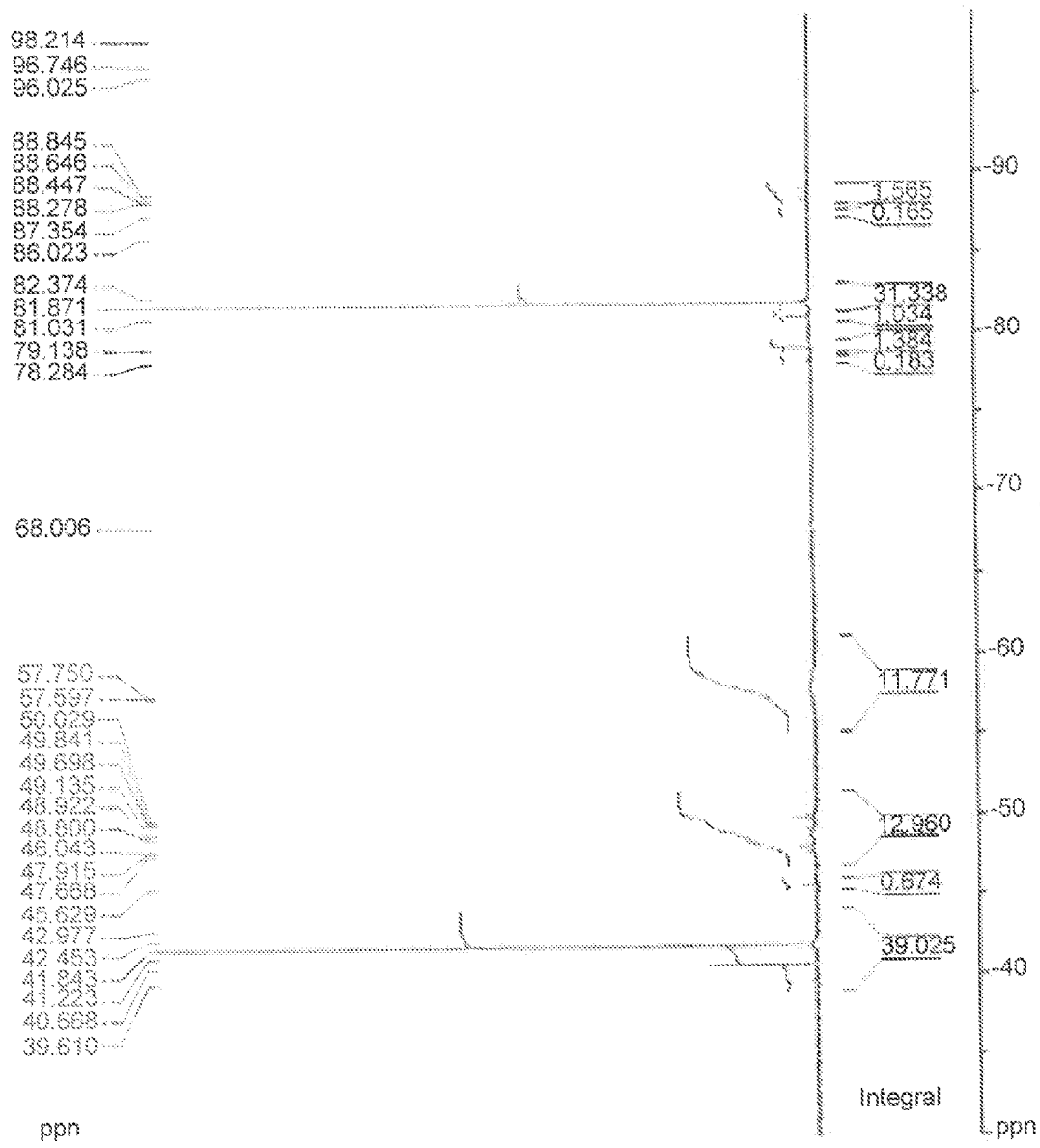

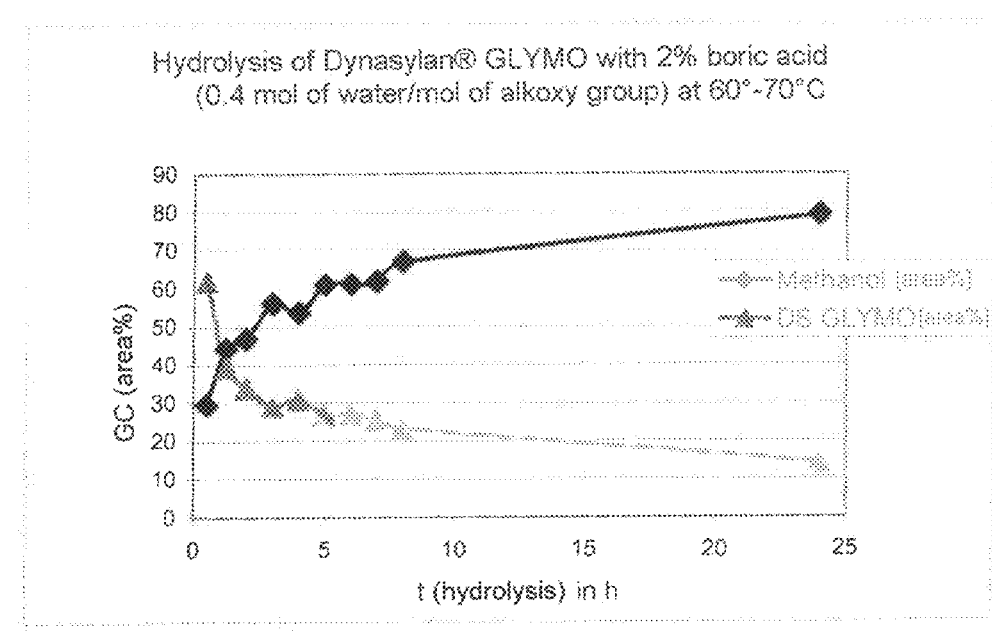
Figure 4: Figure for Example 1

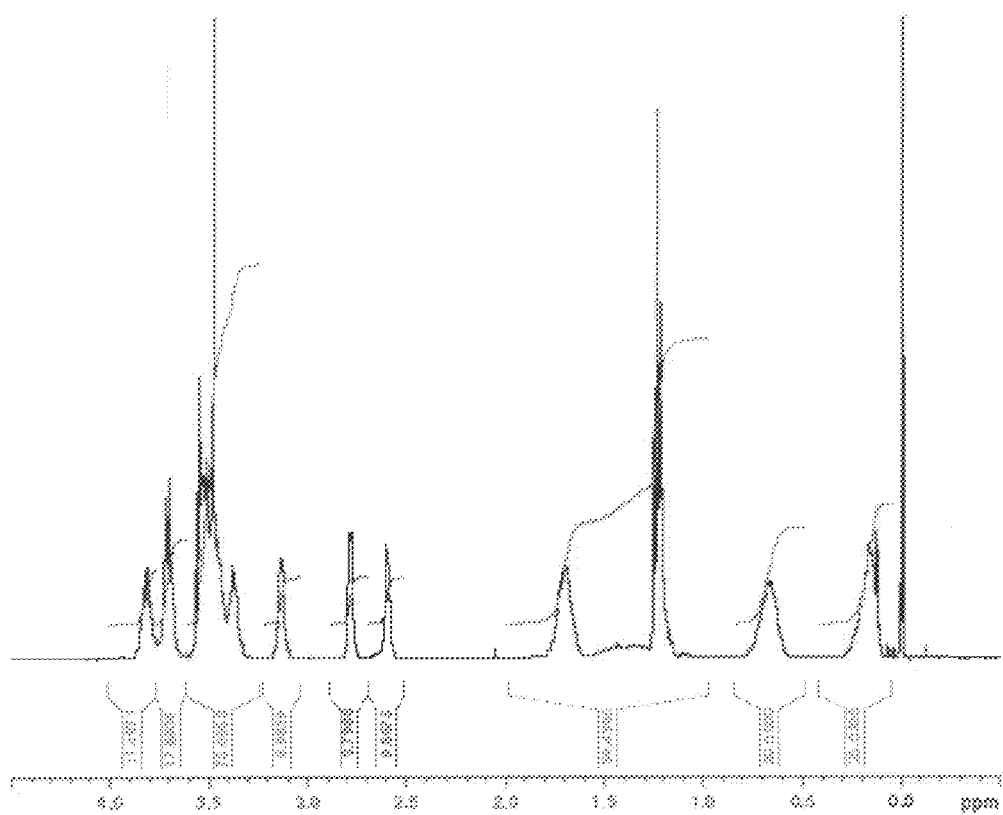
Figure 5a: 1H NMR spectrum for Example 2

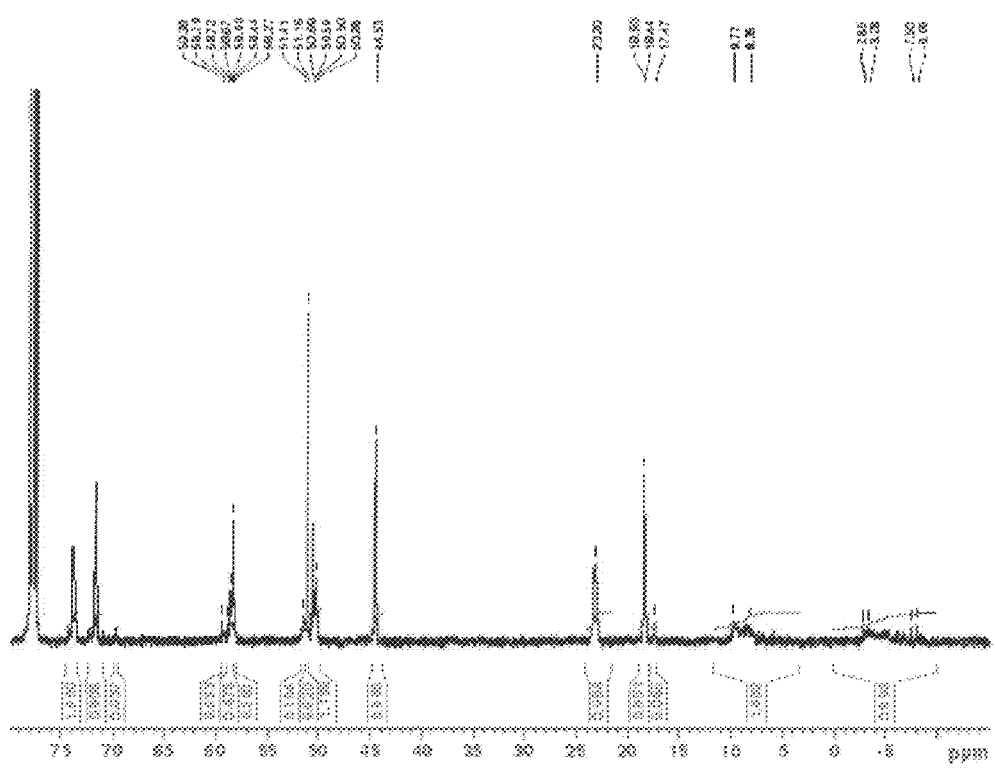
Figure 5b: 13C NMR spectrum for Example 2

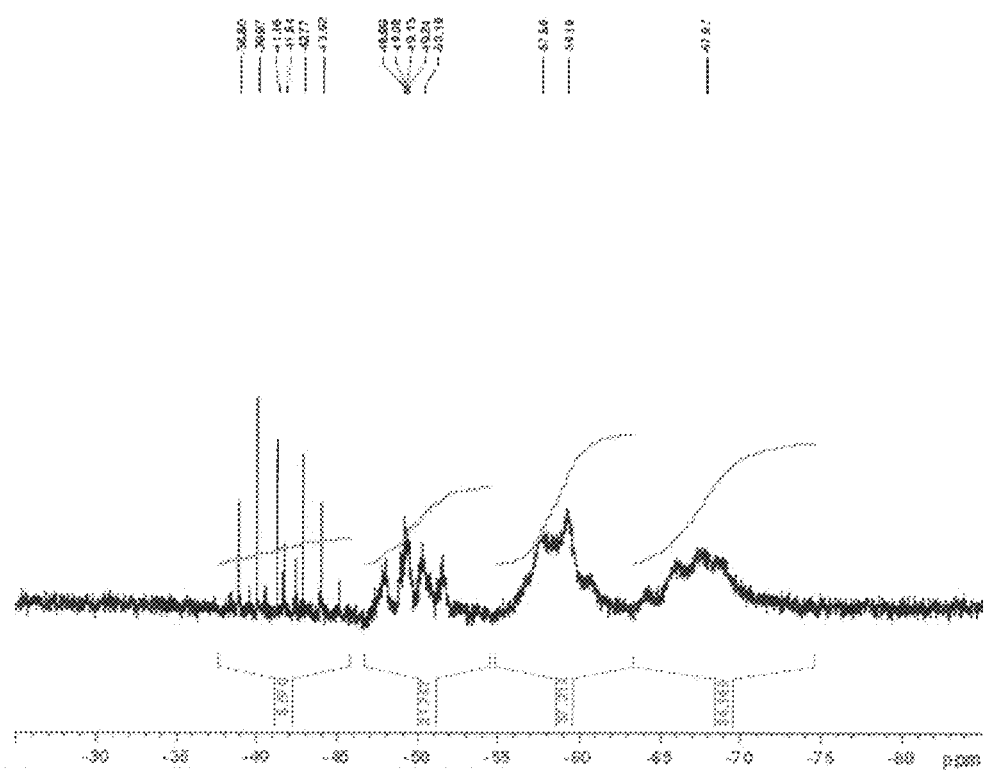
Figure 5c: 29Si NMR spectrum for Example 2

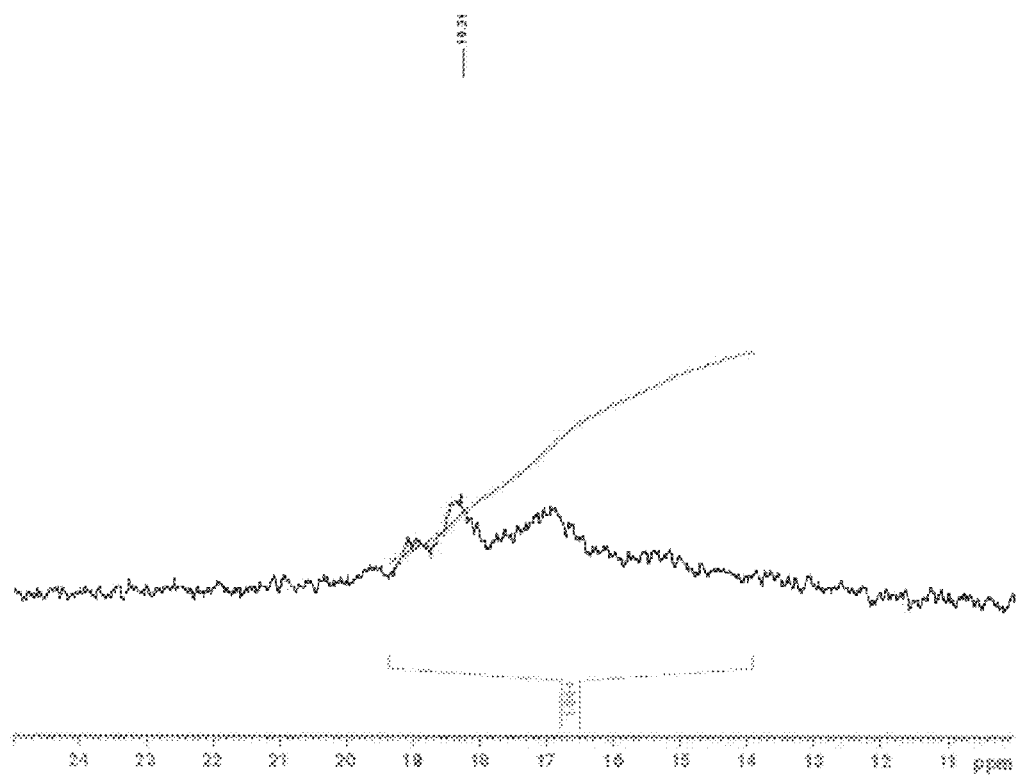
Figure 5d: 11B NMR spectrum for Example 2

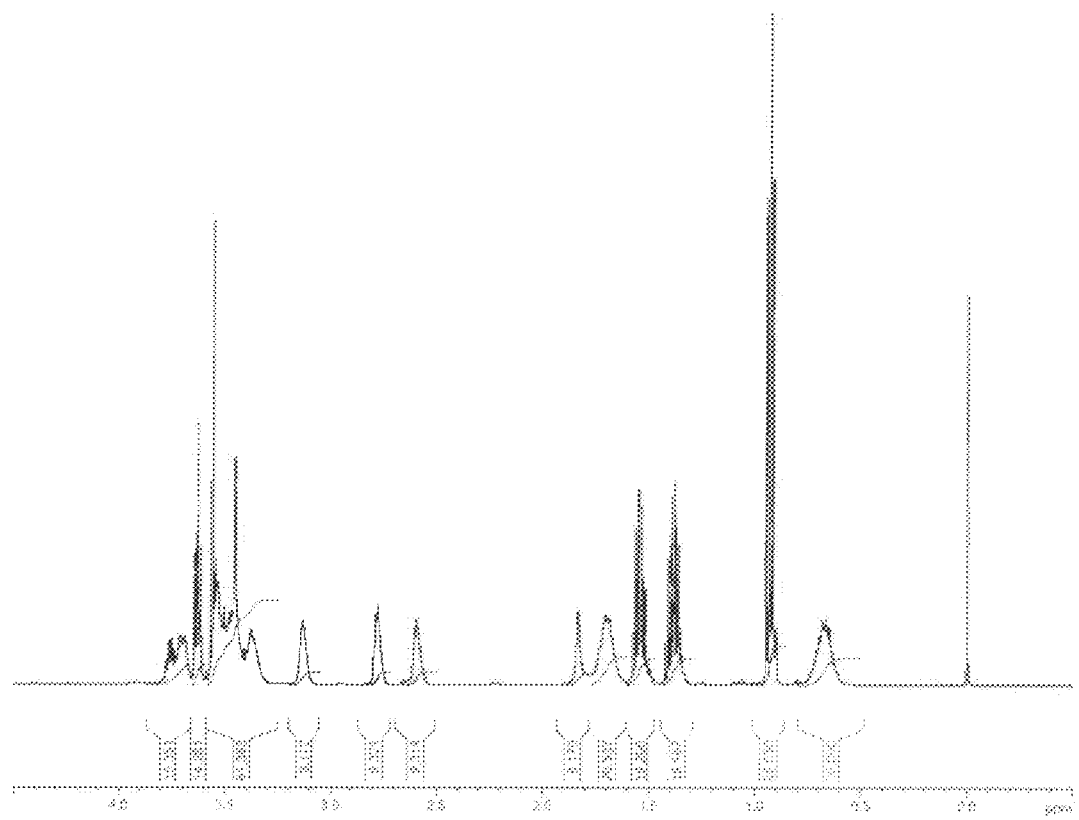
Figure 6a: 1H NMR spectrum for Example 3

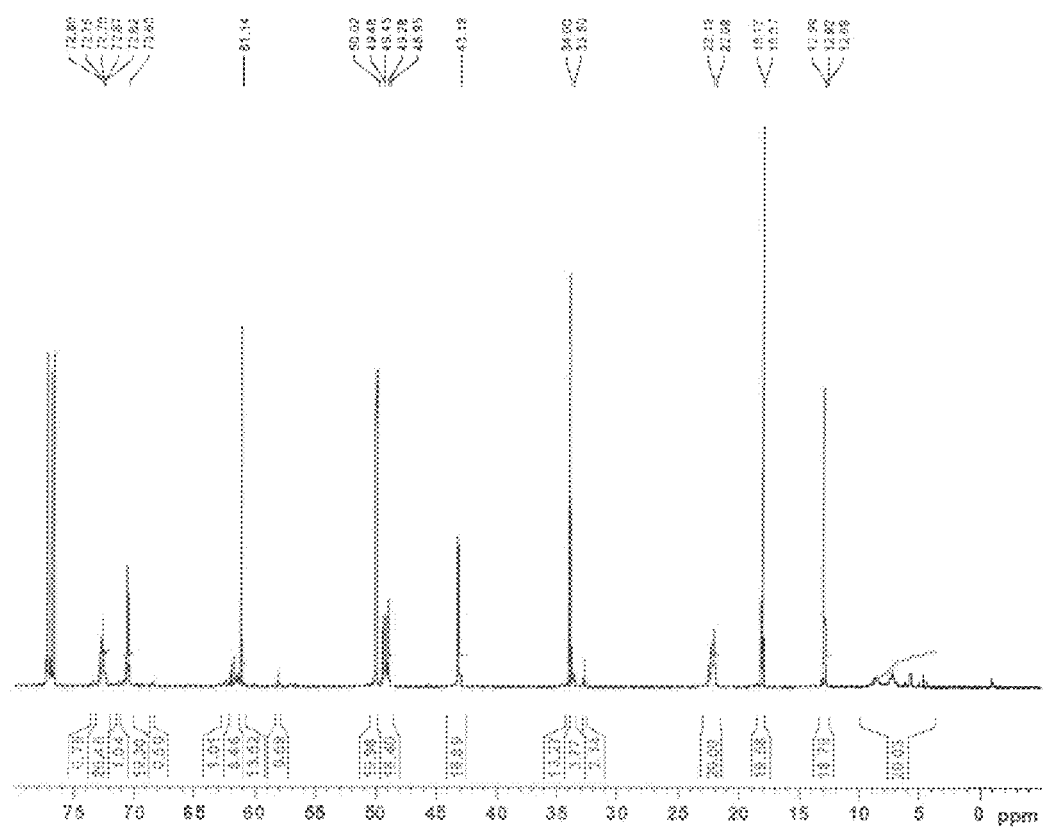
Figure 6b: 13C NMR spectrum for Example 3

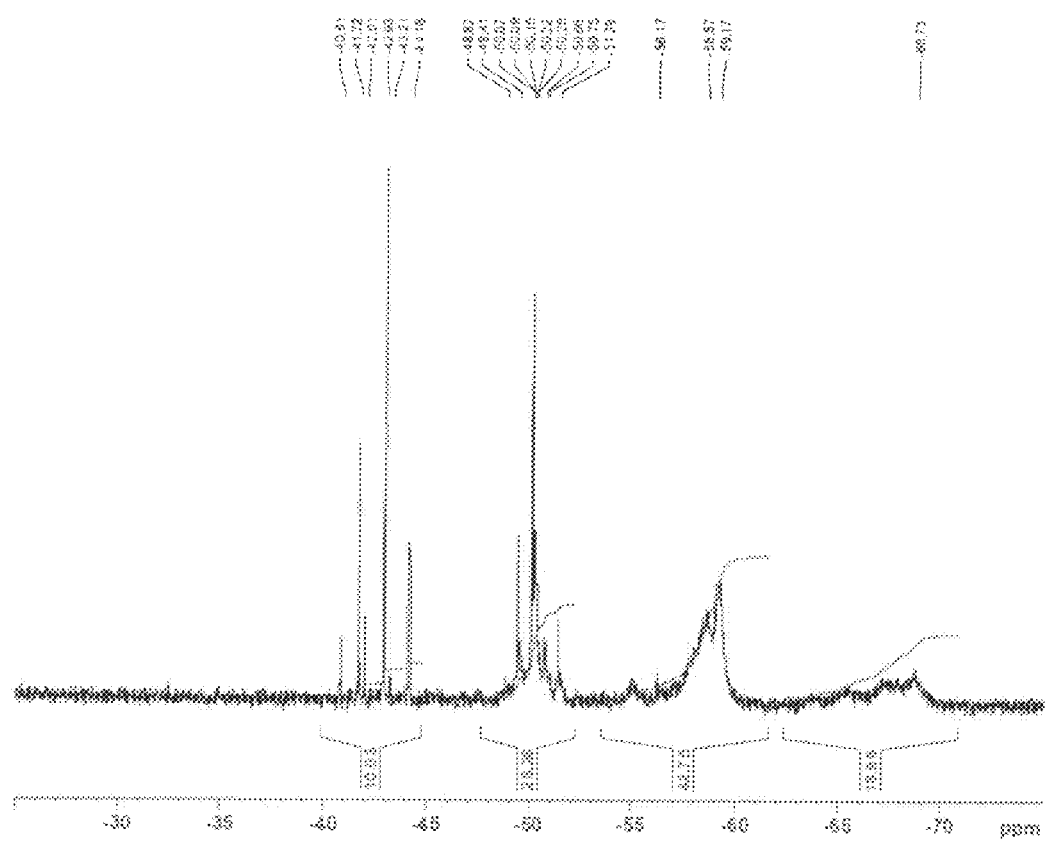
Figure 6c: 29Si NMR spectrum for Example 3

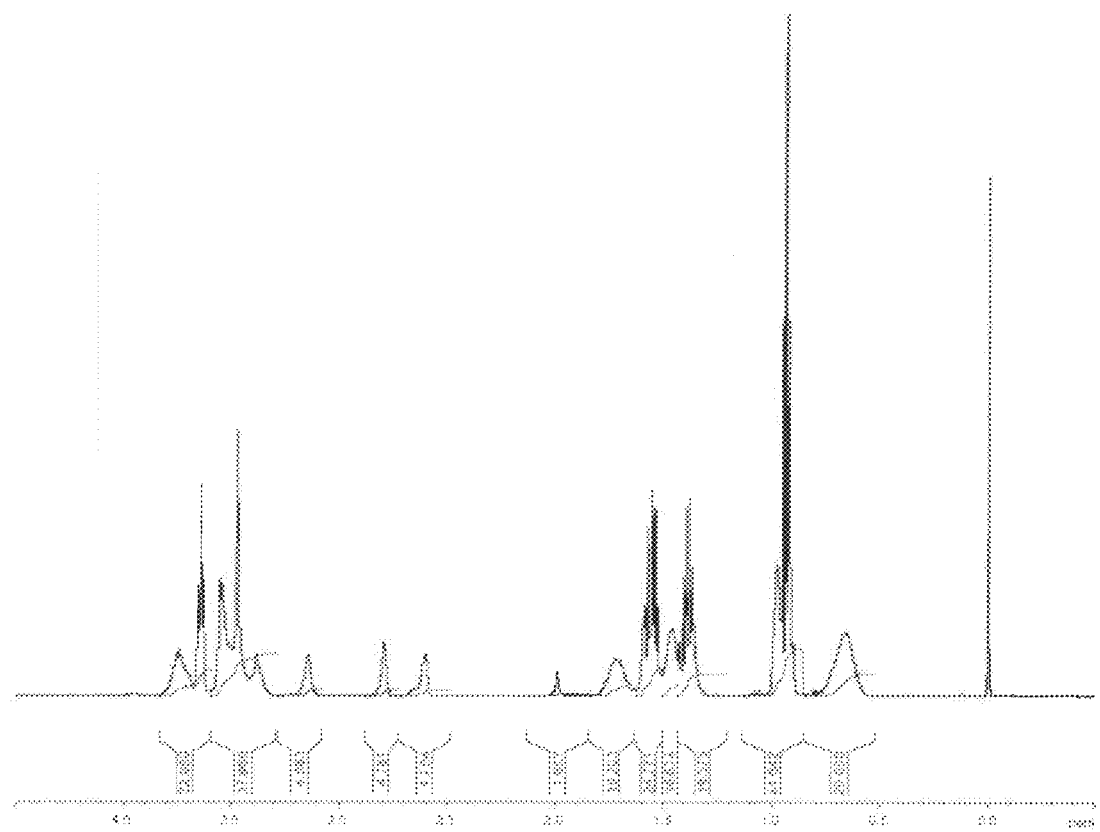
Figure 7a: 1H NMR NMR spectrum for Example 5

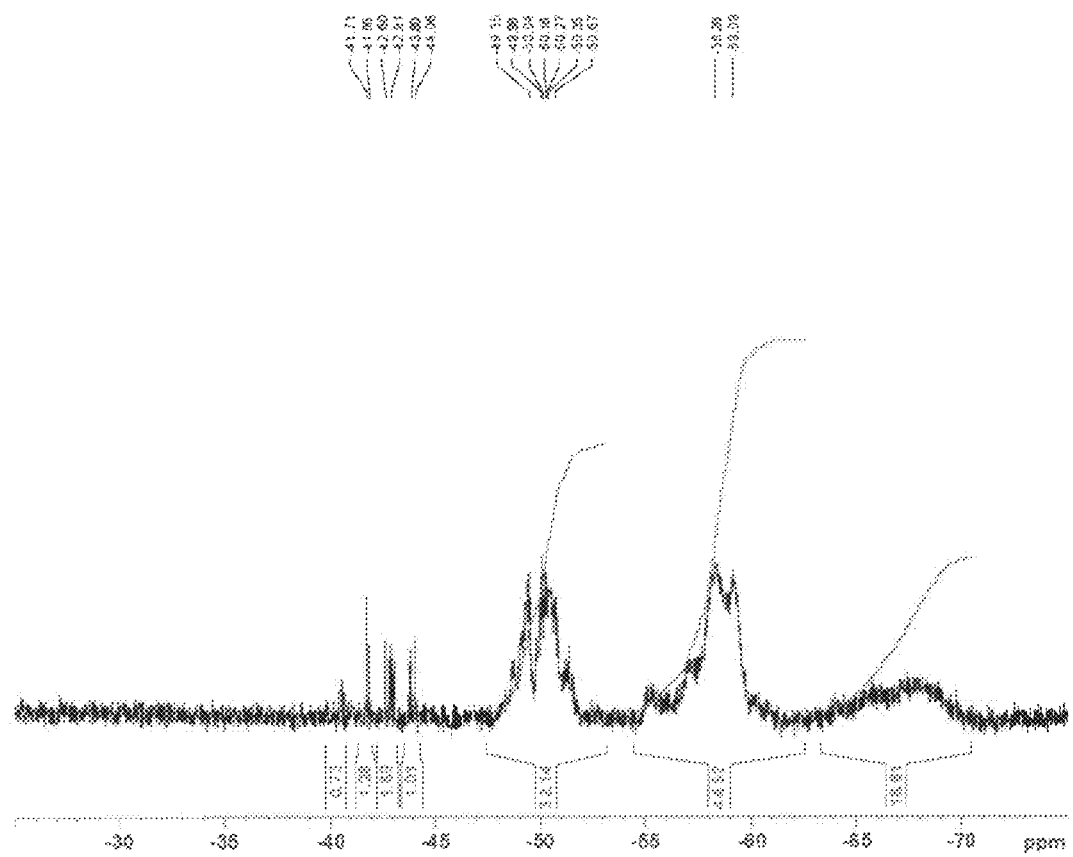
Figure 7b: 29Si NMR spectrum for Example 5

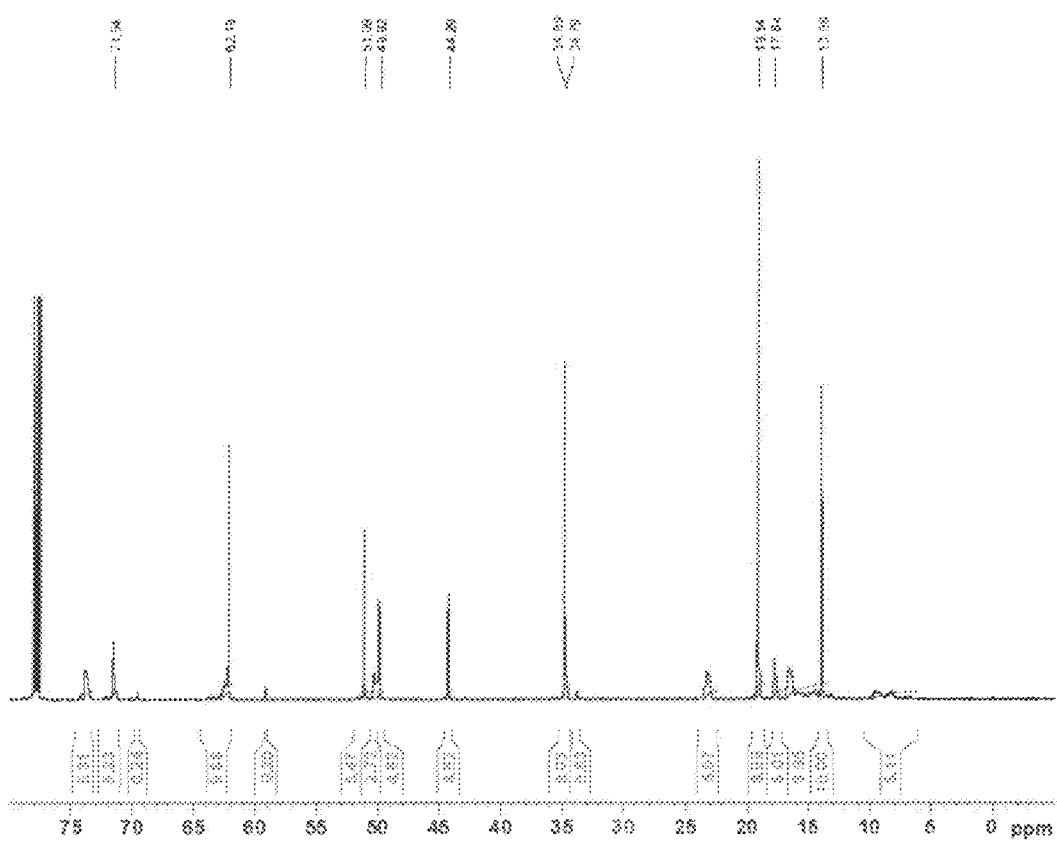
Figure 7c: 13 NMR spectrum for Example 5

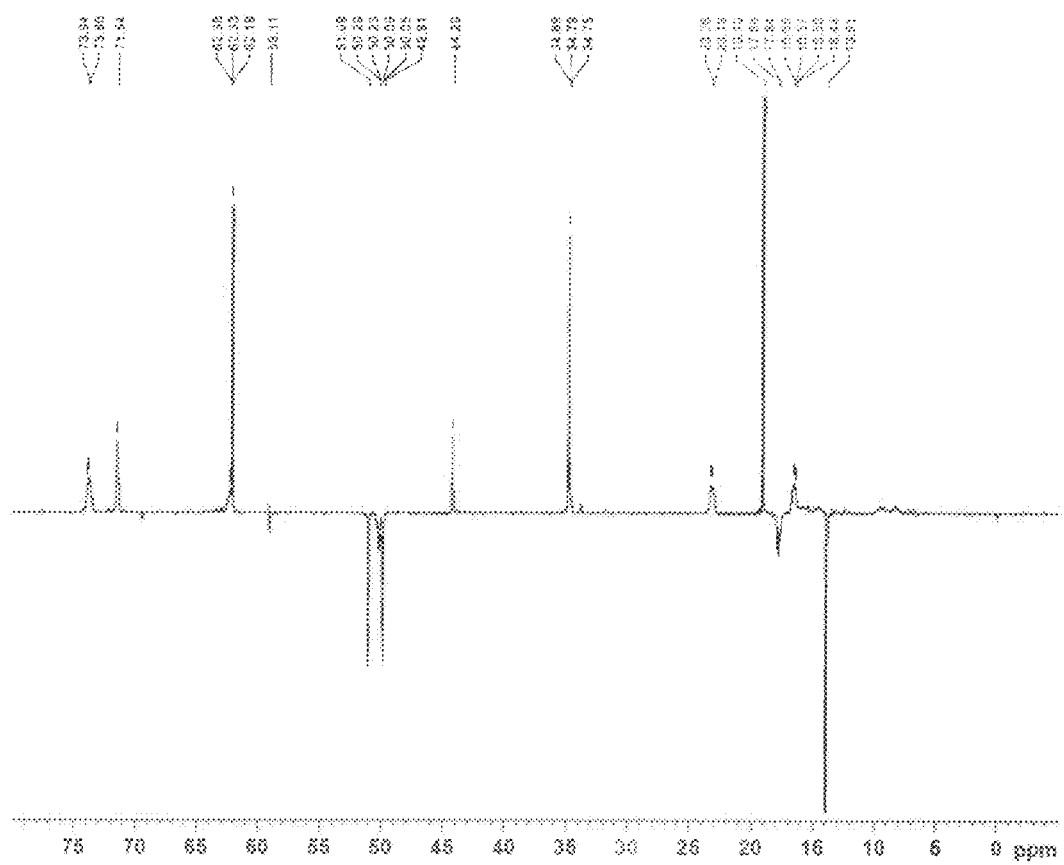
Figure 7d: 13C NMR spectrum for Example 5

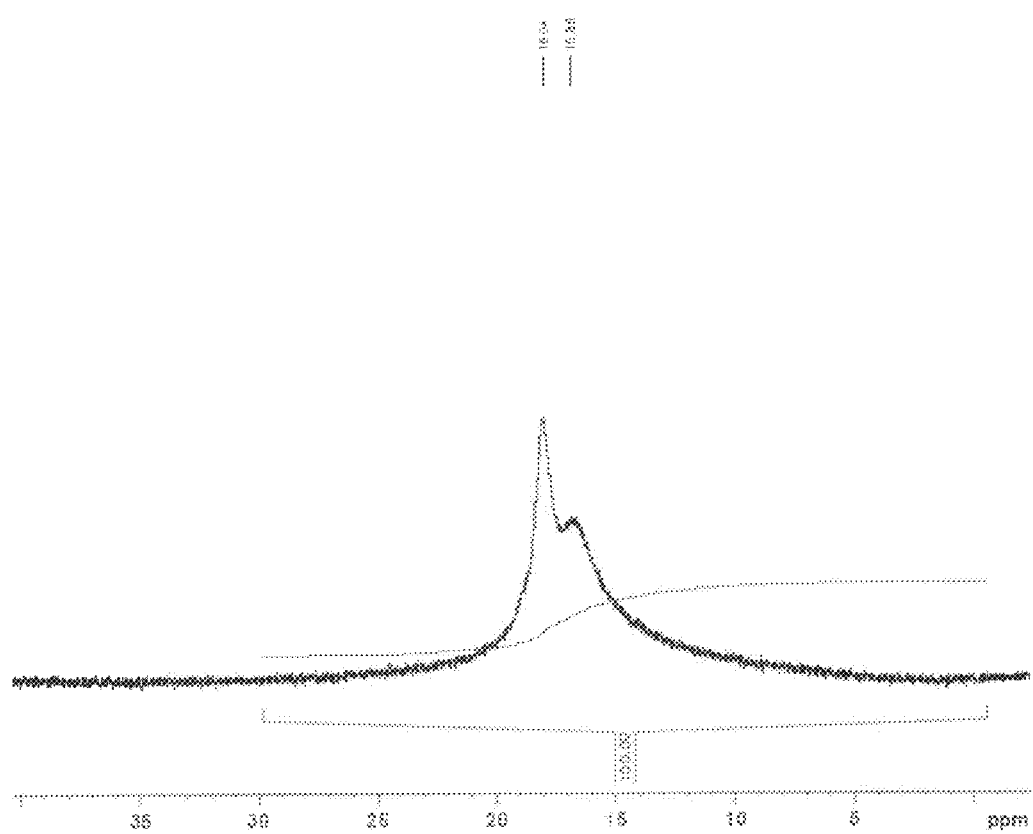
Figure 7e: 11B NMR spectrum for Example 5

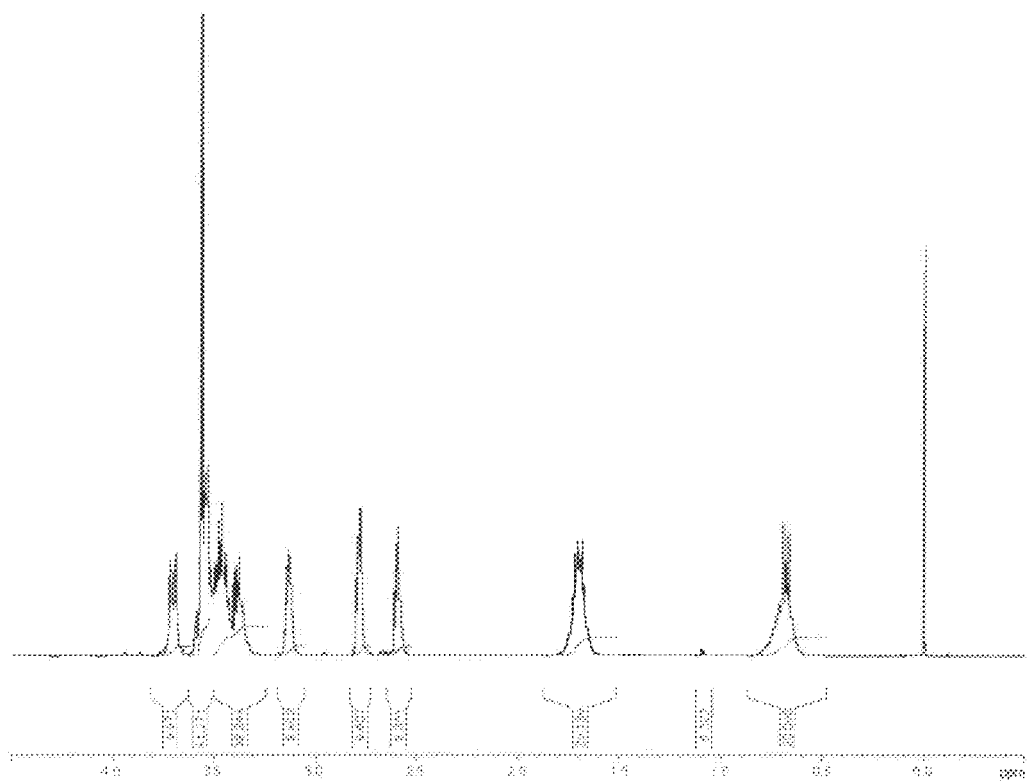
Figure 8a: 1H NMR spectrum for Example 6

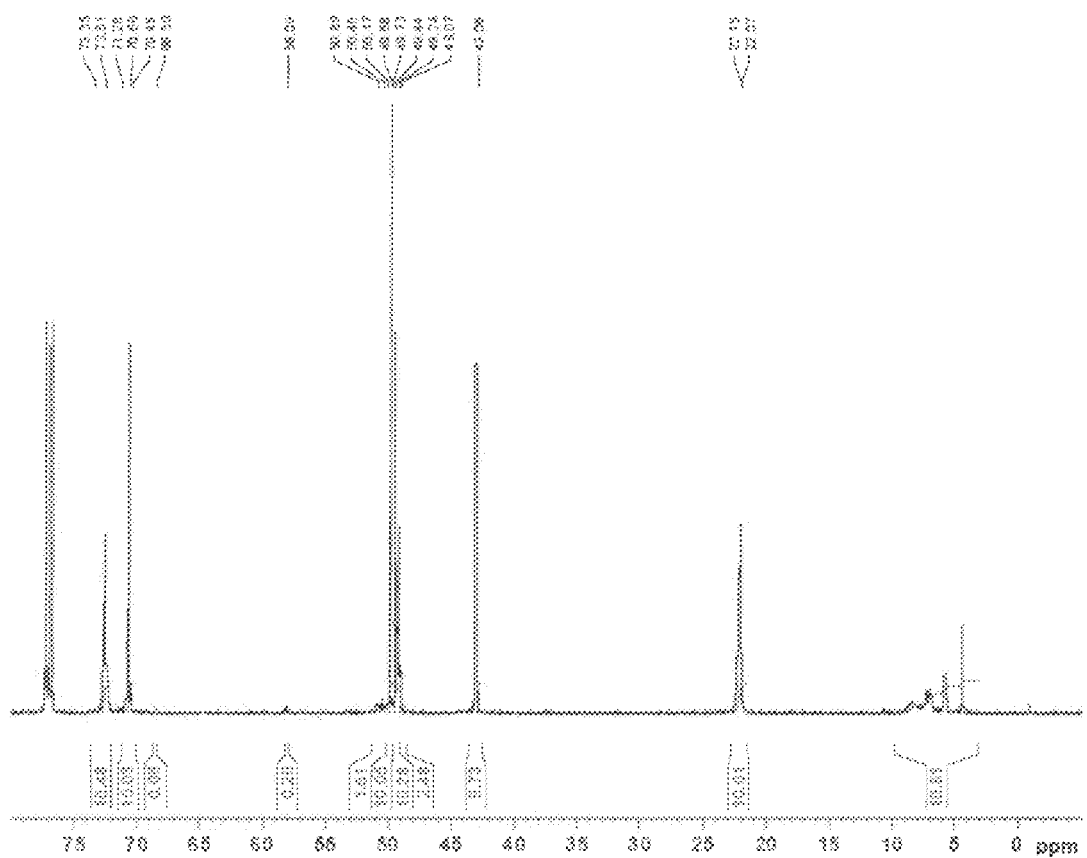
Figure 8b: 13C NMR spectrum for Example 6

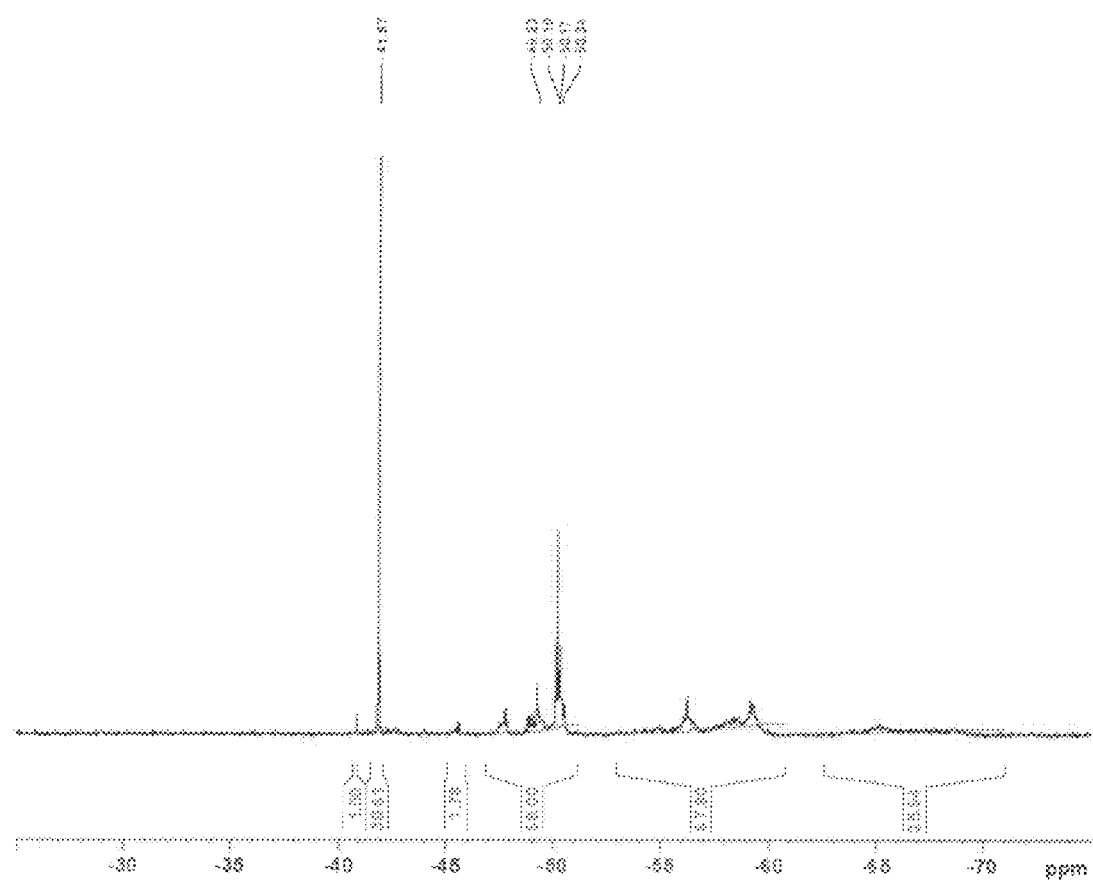
Figure 8c: 29Si NMR spectrum for Example 6

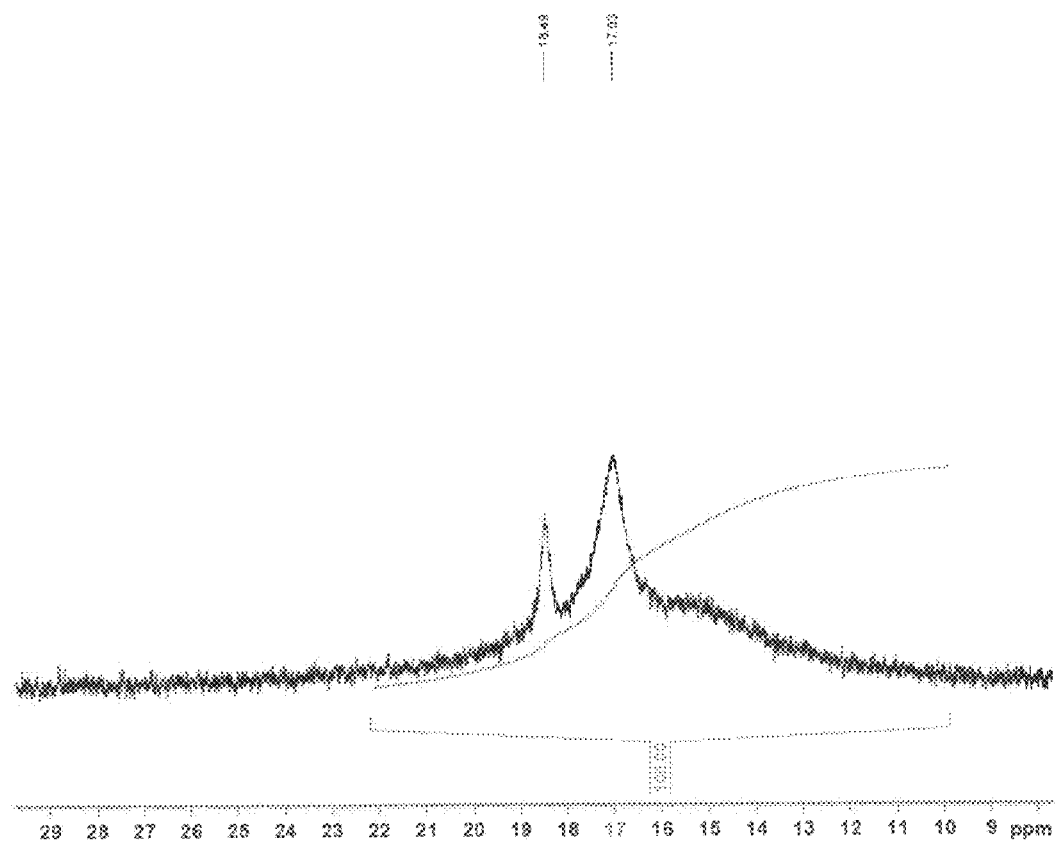
Figure 8d: 11B NMR spectrum for Example 6

PROCESS FOR CONTROLLED HYDROLYSIS AND CONDENSATION OF EPOXY-FUNCTIONAL ORGANOSILANES AND THE COCONDENSATION THEREOF WITH FURTHER ORGANOFUNCTIONAL ALKOXYSILANES

The present invention relates to a specific process for performing a controlled hydrolysis and condensation of epoxy-functional alkoxysilanes or of a mixture of organoalkoxysilanes comprising epoxy-functional alkoxysilanes in the presence of a hydrolysis catalyst.

Here and hereinafter, the term "condensation" also includes the cocondensation of corresponding hydrolysis and/or condensation products.

Organoalkoxysilanes and formulations thereof, especially environmentally friendly aqueous systems, are nowadays important substances in many sectors of industrial manufacture and in daily life; cf., for example, EP 0 832 911 A1.

In the case of use of silanes, for example 3-glycidyloxypropyltrimethoxysilane (GLYMO), as an adhesion promoter, primer, etc., the water required for hydrolysis is usually used in a high excess. The aim here is to achieve maximum hydrolysis. In specific applications, hydrolysis with significantly smaller amounts of water is required. Particularly small amounts of water are present for hydrolysis and condensation when less than 1 mol of water is used per mole of alkoxy function. This is required, for example, whenever silanes are to be used in applications in which free water is disruptive and a hydrolysis of the alkoxy functions is nevertheless required, for example in the case of use as a comonomer in polymerizations or in polymer modification.

Stoichiometric Hydrolysis:

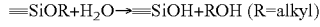

$$\equiv SiOR + H_2O \rightarrow \equiv SiOH + ROH \quad (R = alkyl)$$

In the hydrolysis, excess water remains in the reaction chamber after the reaction. In the case of stoichiometric and substoichiometric hydrolysis, all water is consumed by the hydrolysis reaction.

Many silanes, under the conditions of slightly superstoichiometric, stoichiometric and substoichiometric hydrolysis, are unfortunately not hydrolyzed completely. For example, in the case of hydrolysis of 3-glycidyloxypropyltrimethoxysilane, a monomer proportion of approx. 90% as measured by gas chromatography with thermal conductivity detector (GC TCD area percent) remains even at a high condensation of acidic catalysts, such as HCl or acetic acid, even after hours and even after hydrolysis at elevated temperature. Acidic catalysts, especially HCl, exhibit disadvantages in many applications, for example in coatings. Moreover, HCl-containing systems are not very desirable for reasons of environmental compatibility and owing to the corrosion problems for coating systems.

Boron compounds are used, for example, in glass fabric finishes, sol-gel systems, anticorrosion and barrier coatings, and in sol-gel hybrid systems [inter alia Chem. Mater. (1999), Vol. 11(7), p. 1672-1679; CN1299169A; EP1204784A1; JP2000302932A2; US2001024685A1; US2002051888A1; WO02/038686A2].

Moreover, it is known from EP 1 362 904 A1 to add boric acid to a composition comprising alkyl/aminoalkyl-functional cocondensates, in order to utilize the antibacterial and fungicidal action.

JP04080030A2 (Mar. 13, 1992) discloses a thermoplastic surface and a barrier layer composed of linear polymers which contain Si—O—B bonds and are formed from a sol-gel polymer. For instance, the sol-gel system is obtained by mixing 25 g of tetraethoxysilane, 25 g of ethanol, 1.86 g of 2N HCl and 1.51 g of water at 80° C. over 1 to 2 hours, then 2.5 g of epoxysilane and 1.0 g of boron oxide are added to the mixture which is mixed once again for 1 to 2 hours. After a further addition of 0.5 g of an ethanolic solution of an organic amine, the preparation is applied to a PET substrate and treated at 170 to 300° C.

It was an object of the present invention to provide a further method, i.e. one not known to date from the prior art, which allows organofunctional alkoxysilanes, especially 3-glycidyloxypropylalkoxysilanes as such or corresponding mixtures of organoalkoxysilanes comprising 3-glycidyloxypropylalkoxysilane, to be hydrolyzed reliably and substantially completely and to be condensed at least partly with an amount of water used, especially even with a substoichiometric amount of water.

The stated problem is achieved in accordance with the invention according to the details in the claims.

It has thus been found that, surprisingly, a virtually complete hydrolysis of 3-glycidyloxypropyltrimethoxysilane (GLYMO) is advantageously performed with an amount of water of 0.05 to 5, preferably 0.1 to 2, and especially 0.15 to 1 mol of water per mole of alkoxy function used using or in the presence of boric acid. More particularly, almost all of the GLYMO can be converted to oligomeric products by means of boric acid catalysis within only 7 hours. A virtually complete hydrolysis means in this context that less than 20% by weight or area percent (GC-TCD %) of the monomeric silane originally used remains unhydrolyzed after performance of the hydrolysis in the reaction chamber.

BRIEF DESCRIPTION OF THE DRAWINGS

FIG. 1 shows a GC analysis of the hydrolysis of Dynasylan® GLYMO according to Comparative Example 1.

FIG. 2a shows the 1H NMR spectrum for the hydrolysis product of Comparative Example 2.

FIG. 2b shows the 13NMR spectrum for the hydrolysis products of Comparative Example 2.

FIG. 2c shows the $^{29}$Si NMR spectrum for the hydrolysis product of Comparative Example 2.

FIG. 3 shows the $^{29}$Si NMR spectruym for the hydrolysis products of Comparative Example 3.

FIG. 4 shows a GC analysis of the hydrolysis of Dynasylan® GLYMO according to Example 1.

FIG. 5a shows the 1H NMR spectrum for the hydrolysis product of Example 2.

FIG. 5b shows the 13C NMR spectrum for the hydrolysis product of Example 2.

FIG. 5c shows the $^{29}$Si NMR spectrum for the hydrolysis product of Example 2.

FIG. 5d shows the 11B NMR spectrum for the hydrolysis product of Example 2.

FIG. 6a shows the 1H NMR spectrum for the hydrolysis product of Example 3.

FIG. 6b shows the 13C NMR spectrum for the hydrolysis product of Example 3.

FIG. 6c shows the $^{29}$Si NMR spectrum for the hydrolysis product of Example 3.

FIG. 7a shows the 1H NMR spectrum for the hydrolysis product of Example 5.

FIG. 7b shows the $^{29}$Si NMR spectrum for the hydrolysis product of Example 5.

FIG. 7c shows the 13C NMR spectrum for the hydrolysis product of Example 5.

FIG. 7d shows the decoupled 13C NMR spectrum for the hydrolysis product of Example 5.

FIG. 7e shows the 11B NMR spectrum for the hydrolysis product of Example 5.

FIG. 8a shows the 1H NMR spectrum for the hydrolysis product of Example 6.

FIG. 8b shows the 13C NMR spectrum for the hydrolysis product of Example 6.

FIG. 8c shows the $^{29}$Si NMR spectrum for the hydrolysis product of Example 6.

FIG. 8d shows the 11B NMR spectrum for the hydrolysis product of Example 6.

The process according to the invention advantageously enables preparation of oligomeric silanes which were not obtainable to date. Especially oligomeric GLYMO as such and corresponding cocondensates or mixtures thereof can be prepared for the first time by means of boric acid catalysis.

Moreover, it has been found in a surprising manner that boric acid is also at least partly condensed into the oligomer or siloxane chain in the said condensates or cocondensates and the corresponding mixtures thereof.

Such epoxy-functional condensates or cocondensates can be illustrated in idealized form by the following structural formula; the structure may be linear, cyclic or branched:

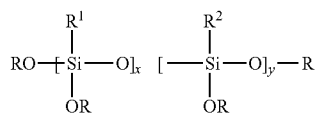

in which
R$^1$ is a

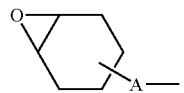

or

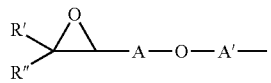

group and

R, R' and R" groups are the same or different and are each a hydrogen (H) or a linear, branched or cyclic, optionally substituted alkyl group having 1 to 6 carbon atoms, preferably H, methyl, ethyl, n-propyl, n-butyl, A and A' groups are the same or different and are each a bivalent alkyl group having 1 to 10 carbon atoms, preferably —(CH$_2$)$_2$—, —(CH$_2$)$_2$—, —(CH$_2$)$_3$—, —(CH$_2$)(CH)(CH$_3$)(CH$_2$)— for A' and (CH$_2$)— for A, R$^2$ groups are the same or different and R$^2$ is a linear, branched or cyclic, optionally substituted alkyl group having 1 to 20 carbon atoms, for example substituted by N—, O—, S—, halogen-bearing groups, such as fluoroalkyl, aminoalkyl, mercaptoalkyl, methacryloyloxyalkyl or OR, i.e. OH or alkoxy, especially methoxy or ethoxy, and x is an integer greater than or equal to 1, preferably 1 to 50, and y is an integer from 0 to 50 and x+y≧2.

Furthermore, it is surprising that the oxirane ring is not split by the boric acid present, even though boron compounds are otherwise used as crosslinking catalysts for epoxy resin systems.

The "GLYMO" hydrolyzates or condensates and cocondensates obtained in accordance with the invention are suitable especially for modifying polyester resins. This achieves significantly improved adhesion and chemical resistance of the coating, as is evident, for example, from the German parallel application entitled "Inorganically modified polyester binder formulation, process for production and use thereof".

The present invention therefore provides a process for performing a controlled hydrolysis and condensation of an epoxy-functional silane of the general formula I R$^1$—SiR'$_m$(OR)$_{3-m}$ in which R$^1$ is a

or

group and

R, R' and R" groups are the same or different and are each a hydrogen (H) or a linear, branched or cyclic, optionally substituted alkyl group having 1 to 6 carbon atoms, preferably H, methyl, ethyl, n-propyl, n-butyl, A and A' groups are the same or different and are each a bivalent alkyl group having 1 to 10 carbon atoms, preferably —(CH$_2$)$_2$—, —(CH$_2$)$_2$—, —(CH$_2$)$_3$—, —(CH$_2$)(CH)(CH$_3$)(CH$_2$)— for A' and (CH$_2$)— for A, R$^2$ groups are the same or different and R$^2$ is a linear, branched or cyclic, optionally substituted alkyl group having 1 to 20 carbon atoms, for example substituted by N—, O—, S—, halogen-bearing groups, such as fluoroalkyl, aminoalkyl, Mercaptoalkyl, methacryloyloxyalkyl or OR, i.e. OH or alkoxy, especially methoxy or ethoxy, and m is 0 or 1, using boric acid [H$_3$BO$_3$ or B(OH)$_3$]

and optionally of at least one further organofunctional silane of the general formula II R$^2$—SiR'$_n$(OR)$_{3-n}$   (II), in which R$^2$ is an organofunctional group as already defined above, R' is methyl, R groups are each independently a hydrogen or a linear, branched or cyclic alkyl group having 1 to 6 carbon atoms, and n is 0 or 1, and by using 0.001 to ≦5 mol of water per mole of alkoxy function of the silanes used, not using any further hydrolysis or condensation catalyst apart from boric acid as a hydrolysis catalyst and condensation component, the condensates formed in the reaction being based on Si—O—B and/or Si—O—Si bonds.

A preferred component of the formula I is 3-glycidyloxypropyltrimethoxysilane. However, it is also advantageously possible to use other silanes, as can be derived from formula I.

The product mixture thus obtained preferably contains, aside from residual amounts (traces) of water and/or one or more alcohols, for example methanol, ethanol or the corresponding hydrolysis alcohol, no further solvents, stabilizers or other additives or assistants. Thus, an inventive mixture more particularly does not contain any organic amines.

According to formula II, it is advantageously possible in the process according to the invention to use methoxy- or ethoxysilanes, which especially bear a functional $R^2$ group from the group of methoxy, ethoxy, methyl, ethyl, n-propyl, i-propyl, n-butyl, n-octyl, i-octyl, tridecafluoro-1,1,2,2-tetrahydrooctyl—to name just a few examples, for example—but not exclusively—methyltrimethoxysilane, methyltriethoxysilane, vinyltrimethoxysilane, vinyltriethoxysilane, n-propyltrimethoxysilane, n-propyltriethoxysilane, n-octyltrimethoxysilane, n-octyltriethoxysilane, hexadecyltrimethoxysilane, hexadecyltriethoxysilane, tridecafluoro-1,1,2,2-tetrahydrooctyltrimethoxysilane, tridecafluoro-1,1,2,2-tetrahydrooctyltriethoxysilane, methacryloyloxypropyltrimethoxysilane, methacryloyloxypropyltriethoxysilane, mercaptopropyltrimethoxysilane, mercaptopropyltriethoxysilane, tetramethoxysilane, tetraethoxysilane.

Also, in the present invention, boric acid is not used as a biocide, but instead advantageously as a catalyst and/or as a condensation component.

In the inventive reaction, per mole of alkoxy function of the formula I and/or II used, preferably 0.05 to 5, more preferably 0.1 to 2, even more preferably 0.15 to 1, especially all numerical intermediate values between 0.15 and 1 mol, for example but not exclusively 0.2, 0.3, 0.4, 0.5, 0.6, 0.7, 0.8, 0.9, of water is used.

Further preferred in the process according to the invention, per mole of silane used, is 0.001 to 1 mol of boron, more preferably 0.01 to 0.5 and especially 0.07 to 0.76 mol of boron, which is advantageously established in the form of boric acid.

Also, in the process according to the invention, the reaction is advantageously performed at a temperature in the range from 0 to 200° C., preferably at 40 to 150° C., more preferably at 50 to 100° C., most preferably 60 to 80°.

For instance, the inventive reaction is performed especially with good mixing over 0.1 to 100 h, preferably 0.5 to 20 h, more preferably 1 to 10 h, most preferably over 2 to 6 h.

It is likewise advantageous in the process according to the invention that the alcohol and/or boric ester present is at least partly removed under reduced pressure from the product mixture thus obtained in a conventional distillation. However, such constituents can also be removed from the product by means of a short-path or thin-film evaporator.

Furthermore, products thus obtained—if required—can be filtered or centrifuged in order to remove suspended particles. For this purpose, it is possible to use, for example, a filter or a centrifuge.

In general, the process according to the invention is performed as follows:

The said organofunctional silanes and the catalyst, and optionally suitable solvents, for example ethanol or methanol, can be initially charged successively in a mixing vessel. With stirring, the temperature is advantageously adjusted to a value in the range from 40 to 80° C. and stirred until the catalyst has dissolved. Suitably, the hydrolysis water, optionally in a mixture with a suitable solvent, for example ethanol or methanol, is subsequently metered in with stirring within a few minutes to hours, preferably within less than 0.5 h. Thereafter, to complete the reaction, the mixture can be kept at a controlled temperature and stirred, for example, at 40 to 100° C. until the silane monomer concentration has attained the desired value, advantageously 0 to 15 GC TCD %. The resulting solvent-containing oligomer mixture can subsequently be used as obtained; however, it is also possible to remove the solvents, i.e. added solvents and hydrolysis alcohol, by distillation under reduced pressure, for example 0 to 1000 mbar, preferably at 100 to 500 mbar, and elevated temperature, for example 40 to 200° C., preferably 50 to 150° C. Should the product contain turbidity, it can be filtered conventionally, for example through pressure filters. The product is generally colorless to yellow, liquid and predominantly has a viscosity in the range from 1 to 1000 mPas, preferably below 100 mPas. The product is advantageously storage-stable at room temperature over several months and also at elevated temperature (50° C.) in most cases.

The reaction monitoring (determination of the concentration of monomeric silanes in the reaction mixture) is effected preferably by means of standard gas chromatography (HP 5890 Series II, thermal conductivity detector). The temperature can be measured conventionally by means of thermocouples. The pressure is measured, for example, by means of a piezo pressure transducer (e.g. Vacubrand DVR 2). The residual monomer content in the products can additionally be checked by means of $^{29}$Si NMR spectroscopy and is advantageously in the range from 5 to 17 mol %. The degree of crosslinking of the product was determined by determining the M, D, T structural units via $^{29}$Si NMR spectroscopy. In the inventive silane condensates, the proportion of M structural units is preferably in the range from 14 to 35 mol %, that of D structures in the range from 36 to 42 mol %, and that of T structures in the range from 15 to 34%. The hydro-methanolysis of the epoxy group can be determined via $^{13}$C NMR spectroscopy. The inventive product compositions advantageously contain only a proportion of 3 to 7 mol % of opened epoxide based on the epoxide content originally used.

Catalysis with HCl (comparative example) affords, according to $^{29}$Si NMR, a significantly higher silane monomer content of 39% after GC analysis in the case of a cocondensate, for comparison, the corresponding B-catalyzed cocondensate exhibits only a proportion of monomeric silanes of less than 2 GC TCD %; on a homocondensate, a monomer content of approx. 80% is obtained in the case of HCl-catalyzed hydrolysis, whereas the corresponding boric acid-catalyzed experiment affords a monomer content of only 14 GC TCD %. Catalysis with alkyl titanates leads to low monomer contents, but the products are not storage-stable (gelation).

The inventive products can advantageously be adjusted to an alcohol content of down to 0.1%. If desired, the inventive condensates can be diluted with organic solvents such as alcohols, ketones, esters, ethers, glycols, glycol ethers, and also gasoline hydrocarbons and aromatic solvents. Use as an additive, for example for polymer syntheses, is generally effected undiluted or with compatible solvents as described above.

Inventive condensates or compositions advantageously find use as a modifier in polymer syntheses, as a comonomer in polymer syntheses, as an adhesion promoter, as a constituent in formulations of paints and lacquer and in the adhesives industry, as a coating material for fillers and pigments, as a surface modifier, to list just a few examples.

The present invention therefore likewise provides for the use of an inventive mixture of silane-based condensates or of a mixture of silane-based condensates prepared or obtained by the process according to the invention in binders, as an adhesion promoter, as a modifier in polymerization syntheses, as a comonomer in polymerization syntheses, as a binder in formulations of paints and lacquers and in the adhesives industry, as a coating material for fillers and pigments, as a surface modifier.

The invention is illustrated in detail by the examples which follow without restricting the subject matter.

EXAMPLES

Comparative Example 1

A 20 ml scintillation bottle was initially charged with 9.4 g Dynasylan® GLYMO, 7.5 µl of conc. hydrochloric acid were added with stirring (magnetic stirrer) and the mixture was heated to 65° C. Subsequently, 0.864 g of demineralized water were stirred in. The mixture was stirred at a bottom temperature of 60 to 70° C. for a further 24 hours.

A colorless, clear liquid was obtained with a content (GC-TCD) of silane monomer of 79 area %; cf. the following FIG. 1.

Comparative Example 2

Preparation of a Dynasylan®-GLYMO condensate with tetra-n-butyl titanate as a hydrolysis catalyst.

The procedure was analogous to Example 2, except that boric acid catalyst was replaced by tetra-n-butyl orthotitanate.

A highly viscous yellow liquid was obtained. After a storage time of 4 weeks at 50° C., the product was solid. The product was analyzed spectroscopically; cf. following FIGS. 2a, 2b and 2c (A060029949).

Comparative Example 3

Preparation of a Cocondensate from Dynasylan® GLYMO/Dynasylan® A with HCl

Preparation analogous to Example 2, except that 9.12 g of hydrochloric acid (37%) were used instead of boric acid. The stirring time was increased from 4 hours to 8 hours at 60 to 73° C. In the $^{29}$Si NMR, 27 mol % of silane monomers were found; cf. following FIG. 3 (A060031330).

Example 1

A 20 ml scintillation bottle was initially charged with 9.4 g of Dynasylan® GLYMO, 0.188 g of boric acid were added with stirring (magnetic stirrer), the mixture was heated at 60° C. for 30 minutes and then 0.864 g of demineralized water was stirred in. The mixture was stirred at a bottom temperature of 60 to 70° C. for a further 24 hours.

A colorless, clear, low-viscosity liquid was obtained with a content (GC-TCD) of silane monomer of 14 area % (FIG. 4).

Example 2

Preparation of a Cocondensate from Dynasylan®GLYMO/Dynasylan® MTES

A 1 l four-neck stirred flask apparatus was initially charged successively with 118.05 g of Dynasylan® GLYMO, 89.15 g Dynasylan® MTES and 15.46 g of boric acid as a catalyst. The bottom temperature was adjusted to approx. 60° C. and the mixture was stirred for approx. 30 minutes until the catalyst had dissolved. At a bottom temperature of 50° C., a mixture of 8.1 g of water and 64.1 g of methanol was added dropwise within 5 minutes. At a bottom temperature of approx. 70 to 75° C., the mixture was stirred for a further 5.5 hours. The monomer content (GC-TCD) was no <5 area %. After cooling overnight, free methanol and ethanol were distilled off at a bottom temperature of approx. 50° C. and a vacuum of 500 to 100 mbar. Subsequently, the reaction product was distilled at 65° C. and <1 mbar for 2 hours. This also distilled off the boric esters still present in the bottom product. This formed a slightly turbid liquid, which was filtered through a pressure filter with SEITZ-EK 1.

A clear and colorless liquid was obtained with a viscosity of 43 mPas and an $SiO_2$ content of 34.8%. The epoxide ring was closed to an extent of 97 mol %. The storage stability was >3 months at 50° C. In addition, the product was analyzed by spectroscopy; cf. following FIGS. 5a, 5b, 5c and 5d (A060029721).

Example 3

Preparation of a Dynasylan® GLYMO Condensate 235.6 g Dynasylan® GLYMO were initially charged with 15.9 g of boric acid in a 500 ml four-neck flask with stirring and heated to approx. 60° C. (white suspension). After approx. 30 minutes, boric acid had dissolved completely. At bottom temperature approx. 46° C., a mixture of 8.2 g of demineralized water and 64.2 g of methanol was added dropwise with vigorous stirring within 5 minutes. This formed a clear, colorless liquid. At a bottom temperature of 60 to 70° C., stirring was continued for 10.5 hours. At a bottom temperature of approx. 50° C. and a vacuum of 500 to 100 mbar, all of the alcohol was distilled off within 4 hours. Subsequently, the reaction product was distilled at <1 mbar up to bottom temperature max. 70° C. for approx. 2 hours. This distilled off the boric esters still present in the bottom product. This formed a slightly turbid liquid, which was filtered through a pressure filter with SEITZ-EK.

A clear and colorless liquid was obtained with a viscosity of 55 mPas and an $SiO_2$ content of 22.1%. The epoxide ring ($^1$H NMR) was closed to an extent of approx. 93 mol %. The monomer content ($^{29}$Si NMR analysis) was 10%. On this subject, compare the following FIGS. 6a, 6b and 6c (A060029949). The storage stability was >2.5 months at 50° C.

Example 4

Preparation of a Cocondensate from Dynasylan® GLYMO/Dynasylan® A

A 0.5 l four-neck stirred flask apparatus was initially charged with 118.05 g of Dynasylan® GLYMO, 104.17 g Dynasylan® A and 15.46 g of boric acid. The bottom temperature was adjusted to approx. 60° C., and, after 1 hour, a mixture of 8.10 g of water and 64.10 g of methanol was added dropwise at a bottom temperature of 44° C. within 4 minutes. At a bottom temperature of approx. 60 to 70° C., the mixture was stirred for a further approx. 4 hours. At a bottom temperature of approx. 50° C. and a vacuum of 500 to 100 mbar, the free methanol and the boric esters were distilled off within approx. 5 hours. 2 hours before the end of distillation, distillative removal was effected with a vacuum of <1 mbar. Thereafter, 64.1 g of n-butanol were mixed in at standard pressure and room temperature. This formed a slightly turbid liquid, which was filtered through a pressure filter with SEITZ-EK 1.

A colorless, clear liquid was obtained with an $SiO_2$ content of 25.4% and a viscosity of 62 mPas. The content of silane monomers (GC-TCD) was <area %.

Example 5

Preparation of a Cocondensate from Dynasylan® GLYMO/Dynasylan® PTMO

In 4 l four-neck stirred flask apparatus was initially charged with 707.3 g of Dynasylan® GLYMO, 492.1 g of Dynasylan® PTMO and 92.4 g of boric acid. The bottom temperature was adjusted to approx. 60° C. After 1 hour, the boric acid had dissolved completely. At a bottom temperature of approx. 40 to 50° C., a mixture of 81.3 g of water and 384.6 g of methanol was added dropwise within 6 minutes. At a bottom temperature of approx. 60 to 70° C., the mixture was stirred for a further 6 hours. At a bottom temperature of approx. 50° C. and a vacuum of 500 to 100 mbar, the free methanol and the boric esters were distilled off within 6 hours. 30 minutes before the end of distillation, distillative removal was effected at a bottom temperature of 60° C. and a pressure of <1 mbar. A colorless, clear liquid was obtained with an $SiO_2$ content of 25.5%. The viscosity was adjusted to 23 mPas by blending with 26% n-butanol. The content of monomeric silanes ($^{29}Si$ NMR) was <5 mol %; cf. following FIGS. 7a, 7b, 7c, 7d and 7e (A060013391). The dilution of the reaction product with 26% n-butanol increased the storage stability from 8 d at 50° C. to >5 months at 50° C.

Example 6

Preparation of a Dynasylan® GLYMO Condensate 233.4 g of Dynasylan® GLYMO were initially charged with 12.4 g of boric acid in a 500 ml four-neck flask with stirring and heated to approx. 60° C. (white suspension). After approx. 30 minutes, boric acid had dissolved completely. At bottom temperature approx. 39° C., 7.3 g of demineralized water were added dropwise with very vigorous stirring within 5 minutes. This formed a clear, colorless liquid. At a bottom temperature of 60 to 70° C., stirring was continued for 9 hours. At a bottom temperature of approx. 50° C. and a vacuum of 500 to 100 mbar, all of the alcohol was distilled off within 15 minutes. Subsequently, the reaction product was distilled at <1 mbar up to bottom temperature max. 70° C. for approx. 2 hours. This distilled off the boric esters still present in the bottom product.

A clear and colorless liquid was obtained with a viscosity of 341 mPas and an $SiO_2$ content of 23.0%. The epoxide ring ($^1H$ NMR) was closed to an extent of 96 mol %. The monomer content ($^{29}Si$ NMR analysis) was 16.8%. See the following FIGS. 8a, 8b, 8c and 8d (A060029950). The storage stability was >2.5 months at 50° C.

In order to lower the viscosity, the product was diluted approx. 3:1 with n-butanol. The viscosity thereafter was 19.0 mPas.

Analyses:

| | |
|---|---|
| NMR | $^1H$ NMR; $^{13}C$ NMR; $^{29}Si$ NMR; $^{11}B$ NMR |
| Viscosity (20° C.) | DIN 53015 |
| $SiO_2$ content | AN-SAA 0754 |
| Free methanol | — |
| Methanol after hydrolysis | AN-SAA 0272 |
| GPC | AA B-HP-FA-AT6 102 |
| Boron content | IPC-MS |

The invention claimed is:

1. A process for performing hydrolysis and condensation of an epoxy-functional silane of formula I:

$$R^1-SiR'_m(OR)_{3-m} \quad (I)$$

wherein $R^1$ is

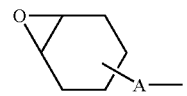

or

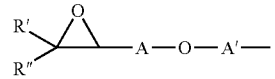

and

R, R' and R" are each independently a hydrogen (H) or a linear, branched or cyclic, optionally substituted alkyl group having 1 to 6 carbon atoms, A and A' are each independently a bivalent alkyl group having 1 to 10 carbon atoms, and m is 0 or 1, and optionally of at least one organofunctional silane of formula II $$R^2-SiR'_n(OR)_{3-n} \quad (II)$$

wherein $R^2$ is a linear, branched or cyclic, alkyl group having 1 to 20 carbon atoms, optionally substituted with fluoro, amino, mercapto, methacryloyloxy, hydroxyl or alkoxy groups, R' is methyl, R groups are each independently a hydrogen or a linear, branched or cyclic alkyl group having 1 to 6 carbon atoms, and n is 0 or 1, the process comprising:

controlled hydrolysis and condensation of the epoxy-functional silane of formula (I) and optionally the organofunctional silane of formula (II) with from 0.001 to 5 mol of water per mole of alkoxy function of the silanes (I) and optionally (II) in the presence of a catalyst consisting of boric acid to obtain a condensate comprising Si—O—B and Si—O—Si bonds.

2. The process as claimed in claim 1,
wherein the mole content of water is from
0.05 to 2 mol of water per mole of alkoxy function of the silanes (I) and optionally (II).

3. The process as claimed in claim 1,
wherein
the mole content of water is from 0.15 to 1 mol.

4. The process as claimed in claim 1,
wherein
a mol content of the boric acid is from 0.001 to 1 mol of boric acid per mole of silane.

5. The process as claimed in claim 1,
wherein
a temperature of the hydrolysis and condensation is from 0 to 200° C.

6. The process as claimed in claim 1,
wherein
the reaction is performed with mixing for from 0.1 to 100 hours.

7. The process as claimed in claim 1,
further comprising
at least partly removing alcohol and boric ester from the hydrolysis and condensation mixture under reduced pressure.

8. A mixture of silane-based condensates obtained by the process according to claim 1, wherein
the mixture comprises:

from 0 to 20% monomeric silane;

from 40 to 100% silane condensates, the condensates comprising Si—O—B and Si—O—Si bonds; and optionally, from 0 to 50% of at least one alcohol, the % values being according to gas chromatography with thermal conductivity detector (GC-TCD); and the % values total 100%.

9. The mixture of silane-based condensates according to claim 8, wherein the epoxy-functional silane of formula (I) is 3-glycidyloxypropyltrimethoxysilane.

10. The process according to claim 1, wherein the content of water is stoichiometric or substoichiometric relative to the moles of alkoxy groups of the silane monomer of formula (I) and formula (II), if present.

11. The process according to claim 1, comprising a silane of formula (II), wherein the silane of formula (II) is at least one silane selected from the group consisting of methyltrimethoxysilane, methyltriethoxysilane, vinyltrimethoxysilane, vinyltriethoxysilane, n-propyltrimethoxysilane, n-propyltriethoxysilane, n-octyltrimethoxysilane, n-octyltriethoxysilane, hexadecyltrimethoxysilane, hexadecyltriethoxysilane, tridecafluoro-1,1,2,2-tetrahydrooctyltrimethoxysilane, tridecafluoro-1,1,2,2-tetrahydrooctyltriethoxysilane, methacryloyloxypropyltrimethoxysilane, methacryloyloxypropyltriethoxysilane, mercaptopropyltrimethoxysilane, mercaptopropyltriethoxysilane, tetramethoxysilane, and tetraethoxysilane.

12. The process according to claim 1, wherein the epoxy-functional silane of formula (I) and the optional organofunctional silane of formula (II) are placed in a solvent prior to the hydrolysis and condensation.

13. The process according to claim 12 wherein the solvent is methanol or ethanol.

* * * * *